United States Patent [19]
Khomo

[11] Patent Number: 5,895,065
[45] Date of Patent: Apr. 20, 1999

[54] METHOD AND MEANS OF ENHANCING HUMAN POWERED LOCOMOTION

[76] Inventor: Malome T. Khomo, 14664 Empire, Dolton, Ill. 60419

[21] Appl. No.: 08/608,856

[22] Filed: Feb. 29, 1996

[51] Int. Cl.⁶ .................................................... B62M 1/00
[52] U.S. Cl. ............................................ 280/221; 280/252
[58] Field of Search ....................................... 280/252, 220, 280/221, 87.1, 87.2, 87.021, 87.041

[56] References Cited

U.S. PATENT DOCUMENTS

| | | |
|---|---|---|
| 222,034 | 11/1879 | Gornall . |
| 297,388 | 4/1884 | Hall . |
| 305,198 | 9/1884 | Kemptster . |
| 519,384 | 5/1894 | Gatling . |
| 581,453 | 4/1897 | Boldt . |
| 742,800 | 10/1903 | Patten . |
| 833,100 | 10/1906 | Wells . |
| 873,889 | 12/1907 | Palmer . |
| 942,333 | 12/1909 | Lennox . |
| 968,355 | 8/1910 | Hopkins . |
| 1,008,187 | 11/1911 | Mannenhorn . |
| 1,273,079 | 7/1918 | Matson . |
| 1,273,693 | 7/1918 | Tucker . |
| 1,334,609 | 3/1920 | Guindon . |
| 1,346,727 | 7/1920 | Tucker . |
| 1,617,357 | 2/1927 | Walter . |
| 1,637,266 | 7/1927 | Maxson . |
| 1,696,927 | 1/1929 | Snyder . |
| 2,002,046 | 5/1935 | Scholtes . |
| 2,449,871 | 9/1948 | Bohler . |
| 2,536,569 | 1/1951 | Purkey . |
| 2,707,112 | 9/1955 | Ludwigson et al. .............. 280/221 |
| 3,164,391 | 1/1965 | O'Neal . |
| 4,161,328 | 7/1979 | Efros ............................. 280/221 X |
| 4,319,760 | 3/1982 | Romano . |
| 4,334,695 | 6/1982 | Ashby . |
| 4,421,334 | 12/1983 | Efros ................................ 280/236 |
| 4,602,801 | 7/1986 | Vincent .......................... 280/11.2 |
| 4,786,069 | 11/1988 | Tang ................................. 280/221 |
| 4,928,986 | 5/1990 | Carpenter ........................ 280/234 |
| 4,976,451 | 12/1990 | Kamenov ...................... 280/226.1 |
| 5,039,121 | 8/1991 | Holter ............................. 280/220 |
| 5,125,677 | 6/1992 | Ogilvie et al. .............. 280/252 X |
| 5,368,321 | 11/1994 | Berman et al. .................. 280/251 |
| 5,501,476 | 3/1996 | Howell et al. ................... 280/230 |

FOREIGN PATENT DOCUMENTS

| | | |
|---|---|---|
| 28 30 259 A1 | 1/1980 | Germany . |
| 2009941 C1 | 3/1994 | Russian Federation ............ 280/252 |
| 879311 | 10/1961 | United Kingdom . |
| WO 96/00163 | 1/1996 | WIPO . |

*Primary Examiner*—Peter M. Poon
*Attorney, Agent, or Firm*—Steven J. Hampton; McAndrews, Held & Malloy, Ltd.

[57] ABSTRACT

This invention concerns enhancing human powered locomotion by converting the forces exerted across the pelvis into wheeled propulsion. The invention may be practiced by a two-wheeled vehicle having: rigid rails secured to a front steering assembly and to a rear trestle anchor with flexible attachment to a pelvic harness; a linear transmission component consisting of two foot-attaching runners that glide along the rails and are attached to a linear power transmission apparatus; and a rotary transmission component operably connected to the linear transmission component and to a rear wheel. The rotary transmission component can be a mechanical apparatus driven by linear motion of the runners or an electrical apparatus powered by electrical current generated from motion of the runners. Hybrid Electro-Mechanical embodiments of the transmission components are also contemplated. The vehicle is operated by a rider simulating walking or running motion.

2 Claims, 3 Drawing Sheets

METHOD AND MEANS OF ENHANCING HUMAN POWERED LOCOMOTION

BACKGROUND OF THE INVENTION

This invention relates to a method of enhancing the efficacy of human-powered locomotion, the apparatus used to practice the method, and the method of operating that apparatus.

Normal human locomotion is effected by walking; a process by which the entire body weight is alternately shifted from one leg to the other as foot-placement is advanced by the free leg. This action is pivoted at the pelvis which has evolved into the most powerful part of the human body. The object of this invention is to harness this pelvic power to enhance the efficacy of locomotive effort.

DISADVANTAGES OF WALKING

Whereas walking is an optimal technique of locomotion for the human anatomy, a few drawbacks can be discovered when seeking enhancements.

A) There is need for continual contact with the ground surface so the greatest achievable speed is severely limited.

B) The contact of the foot with ground surface is stationary, so whatever speeds gained during the stride are consequently lost to friction between the foot and ground surface.

C) The human anatomy limits the span achieved by the legs, thereby curtailing the stride length.

D) The entire body weight needs to be alternately shifted across the pelvis from one leg to the other leading to sideways motions. Likewise, since the pelvis is only partially supported during the stride slight up and down motions are effected. As a result, a portion of the efforts is used on movements of body weight in directions other than the intended forward walking direction.

COMMON METHODS OF ENHANCINQ LOCOMOTION

Commonplace methods of enhancing locomotion are:
1) Running,
2) Stilt Walking,
3) Pogo stick Hopping,
4) Scooting and Skateboarding,
5) Skiing,
6) Skating,
7) Cycling.

These methods differ in the manner by which they gain advantage over walking and it is necessary to classify them for distinguishing them from the new method being proposed here.

Running The walking stride is restricted by the combination of the angular span of the legs about the pelvis within which the body weight can be supported and the length of the legs. Running extends the stride by forward jumps achieved by exerting a force across the pelvis that is substantially greater than that required for walking.

Stilt Walking extends the length of the walking stride by artificially extending the distance between the pelvis and the ground by use of stilts attached to the legs. Whereas stilts reduce the angular span and weigh down the wearer somewhat, the increased length of the stride can more than offset that disadvantage to therefore increase walking speed.

Pogo Stick Walking uses a Pogo stick which is a device comprising a handle bar at its top extremity and sprung footrests at the lower section. When mounted and hopped upon, the spring gets compressed by the feet which are later pushed up by the recoil of the spring, to raise the body further than would be possible with unsprung hopping action.

Scooting and Skateboarding use a wheeled platform to support the body weight after stepping upon it from the ground. The ensuing movement of the mounted platform extends the walking stride by the distance it takes the platform to roll to a standstill. The difference between skateboarding and scooting relates only to the method of steering and maintaining balance upon the platform.

Skiing achieves an extension of the walking stride by attaching to both feet, runners which can slide over the traveled surface. The runner is shaped in such a way as to make it slide more readily forwards than in the backward direction, so that action that approaches walking motion causes forward movement. Backward slippage is restrained further by the use of hand-held grips used to hold the position of the skier when pushing backwards, and to maintain balance when turning or leaning sideways.

Skating, like skiing extends the walking stride with runners which slide over the traveled surface after a step has been taken. Skate runners are short and the traction for avoiding backward slippage when pushing back with the foot is achieved by turning the foot outwards and by also pushing outwards. Enough traction is achieved to obviate stationary ground contact with the traveled surface.

Cycling is a more radical method of enhancing locomotion in a number of respects. In addition to eliminating stationary ground contact by use of a wheeled weight-supporting frame, cycling achieves propulsion by the forced rotation of the wheels via a drive chain and crankshaft that is forced to turn by the rider by pressing the feet against foot pedals. The pedals trace a circular path and the rider assumes a seated position upon a saddle to render cycling into one of the most efficient methods with respect to the exertions required to traverse a given distance.

DISADVANTAGES OF THE COMMON METHODS

Running Whereas running reduces the proportion of the cycle during which there is stationary ground contact and replaces it with a short period of free flight, the need for stationary ground contact for taking the next stride creates a severe restriction to the attainable speed of travel. The vertical motions required for flight also reduce the energy available for forward motion.

Stilt Walking In addition to the need for stationary ground contact for pushing the body forwards with the weight-supporting leg, there is the need for both stilts to have simultaneous ground contact during the transfer of body weight from one stilt to the other so that whenever it takes say one half of a cycle to load or unload body weight, only one half of the cycle remains to transfer the stilt to the next weight-supporting position. This is an inherent limitation to walking speed.

Pogo Stick Walking suffers the disadvantages of wasteful up and down movements and stationary ground contact as cited for walking. In addition, Pogo Stick walking requires exaggerated exercise of muscles above the pelvis along the back. Those muscles are not as powerful as pelvic muscles and therefore tire more quickly than the under-utilized pelvic muscles.

Scooting and Skateboarding Although effective in sustaining separation from the ground surface between pushes, this method retains the need to revert to stationary ground contact to effect the next push. Therefore the restriction cited for running applies to this method. A further restriction relates to the need to permit the platform to slow down to a speed at which another push can be executed conveniently. This further reduces the average speed that can be sustained by this method, which although more efficient than running, has a much lower maximum speed.

Skiing Concomitant with the advantage that slippage provides in the lengthening of the effective stride by use of ski runners is the limitation to the rearward tractive force that a skier can ever exert upon the ground for forward propulsion. The method does not produce dramatic improvements over walking except in conditions where no walking action is required to sustain forward motion as in downhill snow skiing, or on level surfaces where skis perform better than snow shoes in unaided walking.

Skating It has been noted that skating provides the skate-wearer with the means of propulsion that obviates the need for stationary ground contact through the use of a rearward and outward push of the skates in order to develop forward traction. This traction is achieved while the runner is still moving forwards with respect to the traveled ground surface, and while the force exerted upon the traveling runner is at an angle to the direction of travel, and at which angle the runner provides rearward resistance to the traveled ground surface.

The result of these conditions is to keep the pushing skate traveling forward but obliquely away from the intended direction. The overall effect is to produce a skating trajectory that cris-crosses the line of desired travel. This feature results in a discernable loss of energy expended in directions other than those that are intended. Further, the skater has to choose between the conflicting choices of prolonging the backward push to increase thrust and of minimizing the departures from the intended line of travel. The full thrust that the skater can exert is never exercised as a result.

Cycling Whereas the change from a walking posture to the seated posture gives rise to great efficiencies with respect to the effort expended over a given distance traversed, the posture no longer permits the rider to take maximal advantage of the pelvic muscles. When a force that exceeds body weight is exerted it has to be counteracted to prevent the rider from losing the seated posture. The hands which are the only other part of the body firmly attached to the cycle frame are not capable of sustaining much of this counteractive force, especially because they are far removed from the line of force running through the pelvis and along the spine. The arms therefore yield and the body rises to a standing posture so that the effect of the exertions is largely taken up by the body's upward movement instead of the intended propulsion of the wheels.

When vertical body movement is allowed, it can be used to exert forces that are greater than body weight by the execution of knee-sprung bobbing action. There are three kinds of limits to this mode of travel. The first is that the cycle's gear ratio must be so adjusted as to match the cranking rate with a viable bobbing rate. The power of the muscles and the weight of the rider place a narrow range of possible bobbing rates. The second is that the action has to be wholly transmitted across the flexed knee joint by muscles. Because muscles at this joint are smaller than those around the pelvic joints, and because the knee joint is much narrower than the pelvis, the strain to be taken up by the muscles connected at the knees is greatly magnified to the extent of causing rapid fatigue. Thirdly, the bobbing causes the continual shifting of the center of gravity which must be counter-balanced by the continual exertions of the arms and upper body. The rapid fatigue inflicted to the back muscles by Pogo stick hopping takes equal effect in this case.

An alternate way of exerting large forces across the pelvis on a cycle is by the use of a recumbent posture seat to sustain the counteractive force. The drawbacks are first, that considerably more skill is required to operate the cycle, and second, that the back muscles and spinal joints are exercised in a manner to which they are not naturally disposed. The recumbent cycle also requires these otherwise little-used muscles to contain large pelvic forces.

PROPOSED METHODS OF ENHANCING LOCOMOTION

Of the numerous known skate-like devices, U.S. Pat. No. 222,034 discloses an oscillating foot plate driving mechanism that creates a see-saw action to drive skate wheels on one axle. More recent U.S. Pat. Nos. 297,388 and 581,453, disclose vertical foot action to drive a geared wheel with a vertically positioned ratchet bar.

Other devices employ vertical action to drive the wheels using crankshaft assemblies and curved ratchet bars that translate vertical action on one end of the foot plate into horizontal action at the other end. Such devices are disclosed by U.S. Pat. Nos. 873,889 and 942,333. A similar outcome is achieved by a pantograph drive arrangement (U.S. Pat. No. 2,449,871). Drive chains were utilized in vertical tensile power transmissions in place of ratchet bars (U.S. Pat. No. 1,334,609) and in miniature bicycle transmission methods (U.S. Pat. No. 2,536,569).

Other devices disclosed by U.S. Pat. Nos. 1,008,187 and 4,602,801 do not use direct body weight but use foot action at the ankle to turn gears or ratchet rims. Other variants as disclosed by U.S. Pat. No. 833,100 convert lateral action into rotary action causing forward propulsion.

The exercise cycle of U.S. Pat. No. 5,368,321 uses stair-stepping action that is similar to cycling and shares its disadvantages.

U.S. Pat. No. 4,976,451 discloses a human powered vehicle that requires, as part of power transmission, reciprocation by arm pushing of most of the body weight supported on a platform by the stomach. This is both strenuous to the abdomen and fatiguing to the arms. It is thus not a viable enhancement to natural locomotion.

The arm and leg powered cycle of U.S. Pat. No. 4,928,986, as with recumbent cycling, is potentially strenuous to the back. It also requires arm action in the drive stroke against a reciprocating spring, and thus tires the arms wastefully.

U.S. Pat. No. 4,786,069 discloses a dual unicycle which serves simultaneously as a supporting wheel and crank, but provides less support for the required stepping action than conventional bicycle.

U.S. Pat. No. 4,319,760 discloses a hand-propelled skateboard whose wheels are propelled by a rider mounted on its platform and using the hands to pull a transmission chain.

U.S. Pat. No. 4,421,334 discloses a high speed cycle that dispenses with the cycle flywheel and replaces it with a spring reciprocated chain and lever. The leg action suffers the same disadvantage of cycling, and further loss of energy to the reciprocating spring.

U.S. Pat. No. 4,334,695 discloses a walking buggy on which the rider assumes the upright posture. This device suffers the disadvantages of running and walking by transmitting power at the foot contact point only.

U.S. Pat. No. 3,164,391 discloses a Flying Platform Velocipede which requires vertical foot action as with cycle-driven skates.

U.S. Pat. No. 2,707,112 discloses a pedal operated scooter which likewise requires vertical foot action as with cycle-driven skates.

U.S. Pat. No. 2,002,046 discloses a polycycle propulsion means which requires resistance of the arms to offset the jumping effect.

U.S. Pat. No. 1,696,927 employs a treadmill that is limited by requiring the resistance of the arms to the jumping effect.

U.S. Pat. No. 1,637,266 discloses a child's vehicle, a scooter, that requires stair-stepping, and hence has the limits of a cycle and running.

U.S. Pat. No. 1,617,357 discloses a scooter vehicle that requires stair-stepping, and hence has the limits of a cycle and running.

U.S. Pat. No. 1,346,727 discloses a manually propelled vehicle that is operated by a seated user operating a drive mechanism by grasping and oscillating a hand lever.

U.S. Pat. No. 1,273,693 discloses a manually propelled vehicle operated by a rowing action. The transmission mechanism includes a chain that drives that drives a sprocket attached to a wheel axle. A chain grip having a pawl engages the chain to drive the chain in one direction and to move over the chain in the opposite direction. The chain grip is connected to a hand lever that is operated by the rider in a rowing motion. This vehicle does not harness the parts of the human anatomy most adapted to locomotion.

U.S. Pat. No. 1,273,079 discloses a carriage vehicle that requires the reciprocating of the entire seated body weight, and is thus highly inefficient in net propulsion. As with U.S. Pat. No. 4,976,451, described above, it also requires the pulling of the entire body weight with the arms, and is thus rapidly fatiguing.

U.S. Pat. No. 968,355 discloses a propulsion vehicle requiring a rowing action and hence limitation of arms as source of propulsion.

U.S. Pat. No. 742,800 discloses a velocipede harness that includes a belt worn by the rider and a chord extending from the belt to a hook that is secured to the velocipede frame. The harness precludes the jumping effect but, because it is attached to the rider in the common cycling posture, the maximal strain it bears is extended across the knee joint.

U.S. Pat. No. 519,384 discloses a bicycle having a hand propulsion and power storage that adds to the propulsion means but does not overcome the limitations of cycling or hand propulsion.

U.S. Pat. No. 305,198 discloses a rowing vehicle requiring hand propulsion by a rider's rowing motion.

DISADVANTAGES OF THE PROPOSED METHODS

The methods that the above disclosures utilize and which the present invention seeks to improve upon can be categorized as follows.

1) The forcing action is downward in direction and for the most part constitutes body weight transmitted by the foot onto any one of either ratchet bars, chain and sprocket assemblies, pawl rims and pawl bars, crankshafts or pulleys and pulley chords.

2) The forcing action is achieved by rocking the body from side to side against the foot attachments to convert the lateral force into forward propulsion.

3) Flexing action of the foot about the ankle drives the foot plate which acts as a crank.

4) Pulling action of the hands moves a chain or a handle which turns a sprocket on a propelled wheel.

Vehicles designed under the above Method 1 tend to be roller skates by design, with miniature underfoot cycling mechanisms. As a result they suffer the same disadvantages as skating cited above under the 'Disadvantages of the Common Methods' discussion. These vehicles have a limited push stroke which is further restricted by the limitations of the cycle crank. Where a ratchet bar is used the length of the stroke is limited by the amount of 'climbing' that can be tolerated upon the skate before balance becomes unstable. The force is strictly limited to the body deadweight for if a greater force is applied a jump gets executed with the attendant loss of ground contact needed for wheeled propulsion. In this respect, none of the Method 1 proposals harness the full potential of the pelvic muscles.

Vehicles designed under Method 2 tolerate a jumping force by counteracting it against the other skate, but only to the extent of not toppling the rider sideways. The method is thus similarly restricted to less than the full muscular potential of the pelvis. Furthermore, the mechanical translation of lateral forces into forward propulsion exacts large frictional losses to the power transmission. The method is therefore inherently inefficient.

Method 3 vehicles are less efficacious in that they use the calf muscles. These muscles can support body weight, but not for extended periods under continual flexing. It is therefor a poor method of enhancing locomotion.

For the reason cited in Method 3, Method 4 is not beneficial in that it engages the hands in a task that the feet are better adapted at undertaking. The exception in Method 4 is that it by-passes the restrictions that are inherent in common skating and cycling methods.

Therefore, a need exists for a method for enhancing human powered locomotion that overcomes the disadvantages of known mehtods.

Accordingly, an object of this invention is to provide a method of human powered locomotion that takes full advantage of the power of the pelvic muscles.

Another object of the present invention is to provide an apparatus for enhancing human powered locomotion that takes full advantage of the power of the pelvic muscles.

Yet another object of the present invention is to provide a method of human powered locomotion that utilizes the power of the pelvic muscles in a manner that is neither unnaturally tiring nor potentially injurious.

Yet a further object of the present invention is to provide a method of human powered locomotion that harnesses the pelvic power through a body posture that resembles the natural walking and running postures.

Yet another object of the present invention is to provide a method of human powered locomotion that extends the length of a rider's stride by permanently separating the rider from stationary ground contact.

Yet a further object of the present invention is to provide an apparatus for human powered locomotion that separates the rider from stationary ground contact through use of a platform supported by ground-engaging wheels, and that transmits all the forces generated across the pelvis through the simulation of walking or running into the propulsion of the wheels without undue waste of movement in directions other than the intended.

These and other objects and advantages of the present invention, as well as details of the preferred embodiment thereof, will be more fully understood from the following description and the figures.

SUMMARY OF THE INVENTION

This invention overcomes the disadvantages of the previously known methods of enhancing human powered locomotion described above and provides the above noted and other objects and advantages. This invention provides a method of human powered locomotion in which the traveler is separated from the ground surface. The traveler's feet and body above the pelvis engage an apparatus so that any walking or running force is transferred to the attachments and is transmitted to a two-part drive mechanism. One part of the drive mechanism transmits motion in a linear degree of freedom to the other rotary part of the drive mechanism so as to convert the linear motion of one part of the assembly into circular motion of the other part to propel the traveler over the ground.

A vehicle which is preferred for effecting the said method comprises a frame with rotatably attached wheels and attachments for the feet and pelvis. The pelvis attachment is a harness resiliently connected to the frame and the feet attachment is a pair of straps each resiliently attached to a runner. The runners are slidably attached to the frame by means of guides which keep the feet coupled to a power transmission. The power transmission converts the linear motion generated by any walking or running action of the rider's feet into the rotation of the ground-engaging wheels.

The rider operates the preferred apparatus by mounting it at the runners, attaching both feet and pelvis to their respective attachments and simulating natural walking or running action with the runners upon the frame rail guides.

In the following detailed description, spatially orienting terms are used such as "left", "right", "vertical", "horizontal", "lupper", "lower", and the like. It is to be understood that these terms are used for convenience of description of the preferred embodiments by reference to the drawings. These terms do not necessarily describe the absolute location or orientation in space, such as left, right, upward, downward, etc., that any part must assume.

DETAILED DESCRIPTION OF THE PREFERRED EMBODIMENT

Figure 1:
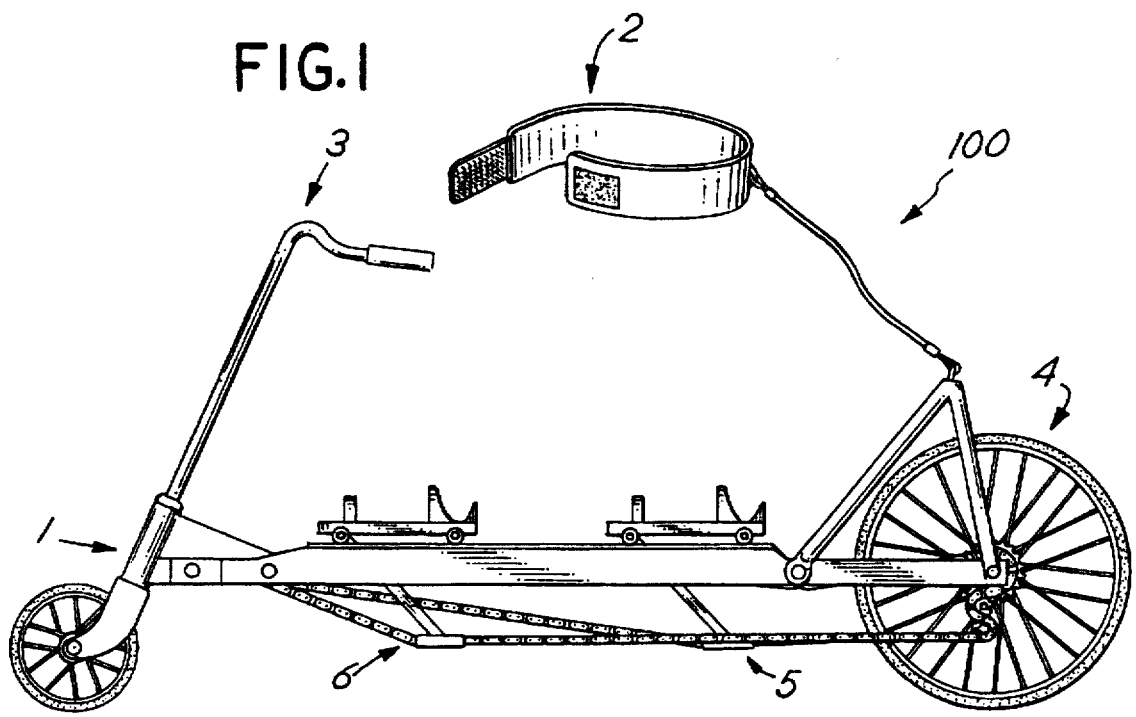
FIG. 1 is a side elevation view of an apparatus for enhancing human powered locomotion according to the present invention.

The apparatus 100 according to the present invention shown in FIG. 1 has six functionally distinct parts.

1) The frame;
2) The pelvic attachments;
3) The steering assembly;
4) The power transmission;
5) The runners; and
6) The pawl bar attachments.

In the following description the functional part numbers given above shall be used as a prefix to uniquely identify the specific members referred to within that functional area. Frame members are numbered from member number 10 onwards, pelvic attachments from member 20 onwards and so on.

Figure 2:
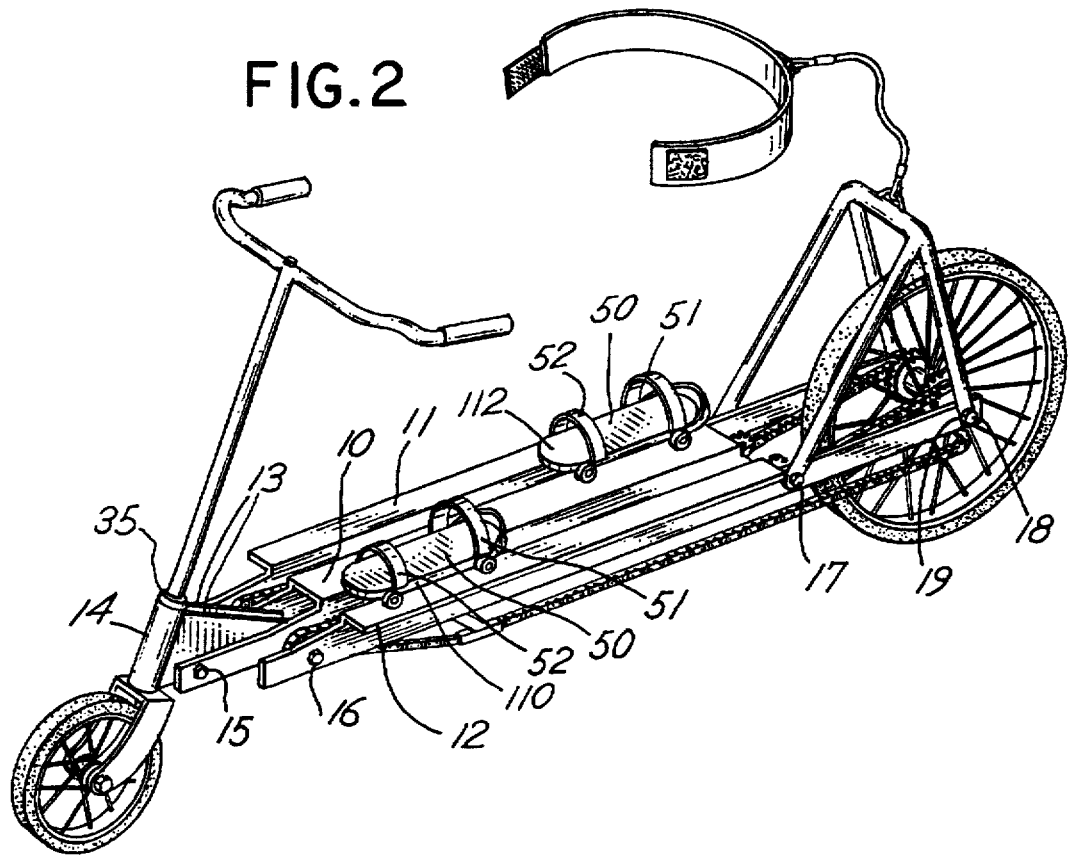
FIG. 2 is a perspective view of the apparatus of FIG. 1.

The Frame as shown by FIG. 2, consists of an elongate central member 10 and elongate outer members 11 and 12. The central member 10 has a flat middle section and first and second vertical legs extending perpendicularly from opposed edges of the middle section. The outer members 11 and 12 are L-shaped having an upper leg and a vertical leg extending perpendicularly from the upper leg. The outer member 11 is positioned adjacent to and separated from the central member 10 having the vertical leg parallel and adjacent to the first vertical leg of central member 10. The upper leg of outer member 11 is coplanar with and extending away from the middle section of the central member 10. The outer member 12 is positioned adjacent to and separated from the second leg of central member 10 having the vertical leg parallel and adjacent to the second vertical leg of central member 10. The upper leg of outer member 12 is coplanar with and extends away from the middle section of the central member 10.

The elongate direction of members 10, 11, and 12 define a lengthwise direction of the apparatus 100. The vertical legs of central member 10 extend from the middle section and the vertical legs of the outer members 11 and 12 extend from their respective upper legs in a downward direction that is perpendicular to the lengthwise direction. The vertical legs of members 10, 11, and 12 have co-axial holes through which central member 10 is firmly attached to outer members 11 and 12 by two bolts 16 (one shown) and two bolts 17 extending through the coaxial holes. The bolts 16 are positioned near a forward end of the member 10 along the length and the bolts 17 are near a rearward end of the member 10 opposite the forward end.

The middle section of central member 10 and the upper legs of outer members 11 and 12 extend along the lengthwise direction a distance that is greater than the distance of a person's stride during walking, that is, the distance that a person's foot is advanced from one ground contact to the next.

The vertical legs of central member 10 at the forward end include forward extensions along the lengthwise direction beyond the bolt 16 and have coaxial holes in those extensions at a location separated from bolt 16. Two steering anchor flanges 13 are generally flat parallel members positioned between and adjacent to the forward extensions of central member 10 and extend along the length of the central member 10 past the location of the holes through which bolt 16 extends. The steering anchor flanges 13 have coaxial holes aligned with those of the forward extensions of the central member 10 and those receiving the bolt 16. Bolts 15 and 16 extend through holes in the central member 10 and the steering anchor flanges 13 attaching the central member 10 to the steering anchor flanges 13. The steering anchor flanges 13 are fixed to a steering housing 14 that defines a bore that is approximately along the downward direction.

As best shown by FIG. 2, the middle section of central member 10 and the upper legs of outer members 11 and 12 serve as guides for the runners 110 and 112.

The vertical legs of central member 10 at the rearward end have rearward extensions extending in the lengthwise direction beyond bolt 17 to slotted ends. The rear wheel axle 18 fits into the slotted ends and is fastened to each end by a nut 19 (one shown).

Figure 3:
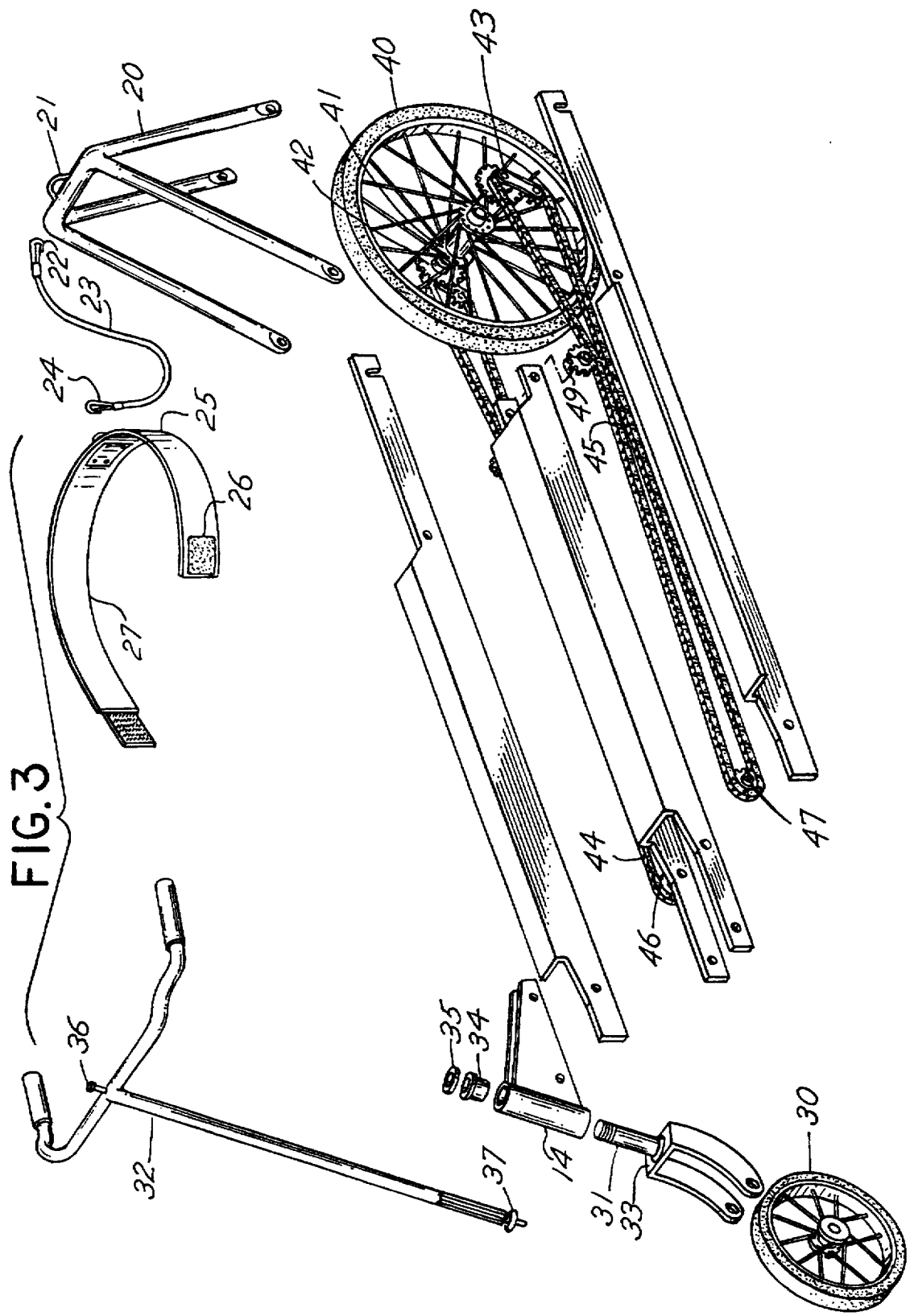
FIG. 3 is an exploded perspective view of the apparatus of FIG. 1 with the runners and fasteners excluded.

The pelvic attachments are shown in FIGS. 2 and 3. A trestle 20 is secured to the rearward extensions of the vertical legs of central member 10 at bolts 17 and nuts 19. The trestle 20 extends upwardly from the central member 10 opposite the downward direction. A ring 21 is secured to the trestle 20 at a location upward from the central member 10. A cord 23 has at one end a latching hook 22 for engaging the ring 21. In a similar way latching hook 24 at the other end of the chord 23 attaches to a ring (not shown) secured to a body belt 25. The pelvic body belt 25 is made wide and is pliable enough to distribute the pelvic forces throughout the relatively tender lower waistline but is resilient enough to contain the forces transmitted across the pelvis. The front of the belt has a releasable end 26 which locks onto its counterpart end 27 when fastened. The body belt may be elaborated into a harness with rigid attachment that may extend to the shoulders and attached thereat by a shoulder harness to take further advantages of the upper body, but in either modification, the point of restraint to the frame is at the pelvic area.

The Steering Assembly consists of three main components, the front wheel 30, the fork 31, the handle bars 32. The lower ends of the fork 31 rest on the axle of wheel 30. The fork 31 has a ringed well 33 at the bottom its stem. The top of the fork stem has an outer screw thread. A set of ball bearings (not shown) fits into the welled ring 33 at the bottom of the fork stem. The frame housing 14 fits over the stem of fork 31 and rests on the ball bearings (not shown) to allow the fork stem to rotate freely against the frame housing 14. The upper end of housing 14 is similarly provided with a well housing 34 to allow for another set of bearings (not shown) to rest on it. This well 34 has a lower sleeve with an inner thread. The sleeve fits loosely into the housing 14 and screws over the top of fork stem 31 and down low enough to leave a minimal clearance between the well 34 and top of housing 14. The set of ball bearings (not shown) placed on well 34 is secured to the housing 14 by the ringed nut 35 which then also aligns the stem of fork 31 to housing. When nut 35 is tightened the fork 31 is rotably secured to the frame housing 14 and forms a steering column. The stem of the handle bars 32 fits into the steering column through the nut 35 and into the stem of fork 31. The lower end of the handle bar stem is slitted into straight strands to allow the end to flare when pressed outwards. The handle bars are thereby firmly locked to the fork when the bolt 36 that runs from the top of the handle bars through the handle bar stem is tightened against the tapered nut 37 while the lower stem of the handle bar 32 is in the steering column.

The transmission comprises a rear wheel 40 having a hub 41 to which two sets of sprockets 42 and 43 are attached at opposed ends as best shown by FIG. 3. Flywheels 46 and 47 are mounted between the central member 10 and a side member, 11 and 12 respectively, at a location adjacent to the forward extensions of the vertical legs of the central member 10 by the bolts 16 (shown by FIG. 2). Endless chains 44 and 45 engage the rear portions of sprockets 42 and 43, respectively, and the front portions of the flywheels 46 and 47, respectively. Idler sprockets 48 and 49 are mounted between the central member 10 and the side members 11 and 12, respectively, adjacent to the rearward extensions of the vertical legs of central member 10 by the bolts 17 (shown by FIG. 2). The idler sprockets 48 and 49 guide the top arcs of the chains 44 and 45, respectively, below the middle section of the central member 10 and the upper legs of side members 11 and 12.

Figure 4:
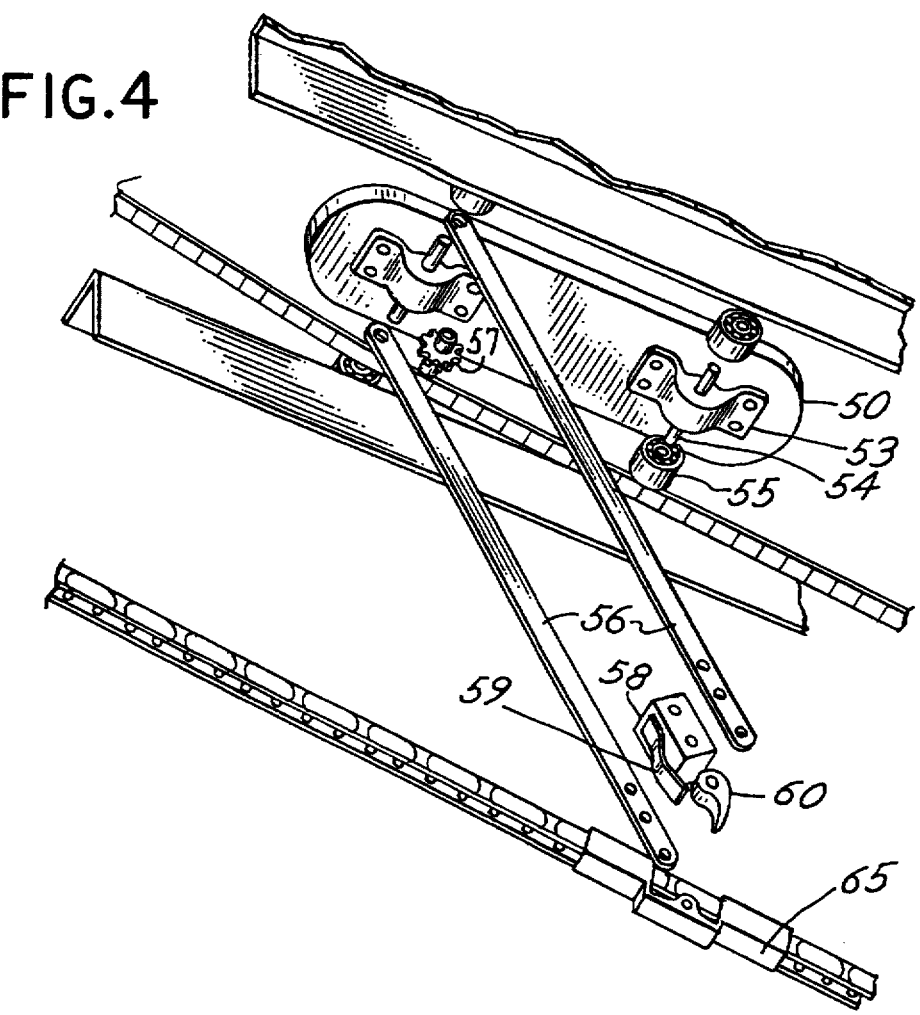
FIG. 4 is an exploded perspective bottom detail of a runner of the apparatus of FIG. 1 in place, with fasteners excluded.

Each runner 110 and 112 has a foot plate 50 configured to accept the rider's foot orienting the anterior/posterior direction of the foot along the length of the members 10, 11, and 12. Foot straps 51 and 52 are secured to an upper surface of the foot plate 50 and engage the rider's ankle and instep respectively. Each foot plate 50 and foot straps 51 and 52 provide a foot attachment of a runner. As shown by FIG. 4, two axle mountings 53 are secured to the bottom of each foot plate 50, one near the forward and the other near the rearward extent of the foot plate 50. Each axle mounting 53 is secured to a foot plate 50 by four screws.

Each axle 54 extends laterally outwardly on either side of its axle mounting 53. A roller wheel 55 (two shown by FIG. 4) slides onto each outward extension of an axle 54. Each wheel 55 rotates freely about an axle 54 and is wide enough to roll on the upper surface of the middle section of the central member 10 and the upper surface of the upper leg of side members 11 and 12.

The Pawl Bar Attachments include two elongate arms 56 that serve as pawl brackets. As best shown by FIG. 4, each arm 56 has a hole near a first end that is sized to closely surround an axle 54 extending from an axle mounting 53 positioned near the forward extent of a foot plate 50. Two arms 56 extend from each foot plate 50, one from each opposed extension of the axle 54 near the forward extent of the foot plate 50. The two arms 56 are kept apart on the upper end by a cogged bushing 57 positioned between the arms 56 near the first end, and at a second or lower end by a ballast block 58. The upper segment of the chain is kept away from the foot plate 50 by threading between the arms 56 and below the bushing 57. A spring 59 fastened onto the ballast block 58 extends beyond the ballast block 58 towards the second ends of the arms 56.

Figure 5:
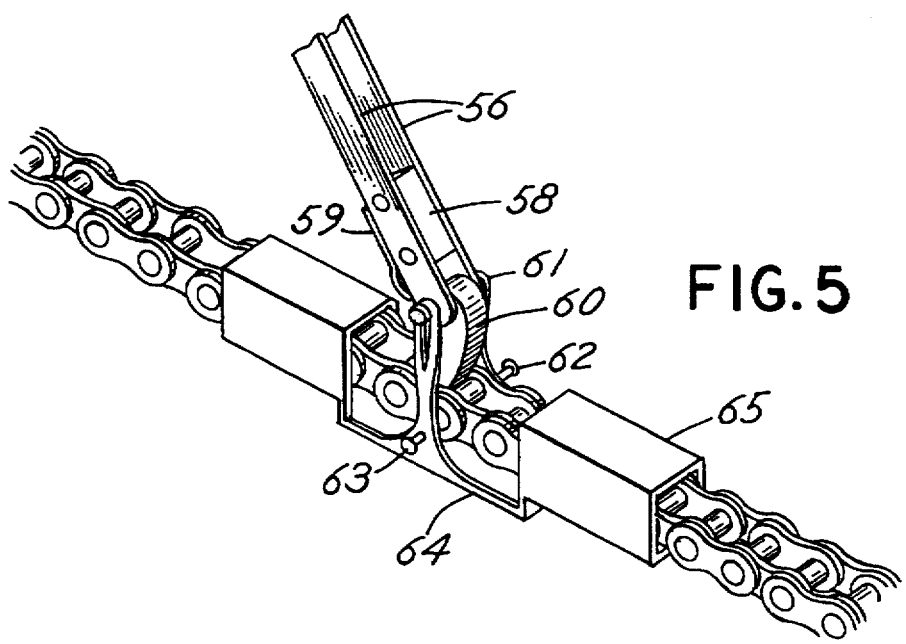
FIG. 5 is a perspective top view of the runner attachments to the transmission.

A pawl bar 60 is claw shaped and is pivoted at a broader blunt end by a pin 61 that journals through coaxial holes through the arms 56 at the second ends of the arms as best shown by FIG. 5. The pin 61 is held in place with the slotted clips 62 and 63 that extend to a chain guide 64. The spring 59 extends from the ballast block 58 and abuts the blunt end of the pawl bar 60 urging the pawl bar 60 to rotate about the pin 61 to displace a sharp end of the pawl bar 60 toward the chain guide 64.

The chain guide 64 includes two separated sleeve sections 65 through which the upper run of a chain 44 or 45 passes. The sleeve sections 65 are joined by a central plate extending between the sections 65 below the chain. The sleeve sections 65 are separated sufficiently to allow the pawl bar 60 to engage the chain 44 or 45 between the sections 65 as best shown by FIG. 5. The clips 62 and 63 lock into the central plate of the chain guide 64.

The pawl bar 60 defines a lower surface adjacent to the chain 44 or 45 that extends from the blunt end curving toward the chain. When the arms 56 are displaced generally along the chain in a direction away from the pawl bar 60, the lower surface abuts the chain urging the pawl bar 60 to rotate about the pin 61 and away from the chain thereby disengaging the pawl bar 60 from the chain and allowing the arms 56 to displace relative to the chain.

The pawl bar 60 also defines an upper surface opposite the lower surface that extends from the blunt end curving toward the chain to meet the lower surface defining a sharp end of the pawl bar 60 opposite the blunt end. When the arms 56 are displaced generally along the chain in a direction toward from the pawl bar 60, the upper surface abuts a roller of the chain urging the pawl bar 60 to rotate about the pin 61 and toward from the chain to abut the ballast block 58 which prevents rotation of the pawl bar 60. The pawl bar 60 is thereby positioned abutting a roller of a chain 44 or 45 causing the chain to move with the arms 56. the chain 44 or 45 causes a sprocket 42 or 43, respectively, to drive the rear wheel 40.

AN ALTERNATE OF THE PREFERRED EMBODIMENT

Whereas the above embodiment is the result of selecting a mechanical medium of power transmission, it must be indicated that the function is the translation and transmission of linear forces to rotary forces and not in the medium itself. To that effect, a description of an alternate embodiment of the same invention shall be made to clarify the essence of the invention.

The Transmission comprises an electrical conducting material connected to a rotary drive motor and a linear electric generator so as to effect a closed electrical circuit between generator and motor.

The Drive Motor comprises a stationary casing rigidly attached to the drive axle and frame and a rotating spindle that is attached to the drive wheel hub. The transmission conductor leads are attached to the motor casing and also terminate at the linear generator terminals.

The Linear Generator comprises linearly spiraled electrical generator coils firmly attached along the rail surface, and a magnetic flux generator made to glide along the coils in close proximity to the coils by means of a guide bracket that is slidably attached to the foot plate.

The Flux Generator comprises a magnetic core attached to the guide and provides magnetic flux to generator coils the from the guide brackets. Flux density may be boosted by an independent power source such as a battery. In such an event the battery is to be attached to the frame and tethered to the runner plates by flexible conductors to prevent waste by reciprocating the weight of the batteries on the runners.

All the other functionally distinct parts of this alternate to the preferred embodiment are identical to those of the embodiment described above. These include the frame, the pelvic attachment, the steering assembly and the runners.

HYBRID ELECTRO-MECHANICAL EMBODIMENTS

On the basis of the teachings given above it needs mention that many combinations of the above two embodiments can be derived without changing in any way the essence of the present proposed invention. As one example, rotary electrical generation may be adopted instead of linear electrical generation. Such generation can be effected by the runner roller generator wheels. As another example, a conventional drive motor may be mounted onto the frame at the flywheel bearing assembly, and the motor could drive the flywheel and subsequently the drive sprocket through the mechanical chain as described in the preferred mechanical embodiment. Finally, it must be taught that the rider's weight may be supported over the rails by any slidable medium. Magnetic levitation is one such medium which is scientifically established as possible but yet not economical, so that mechanical rollers will effect the same slidable support onto the frame.

OPERATION OF THE PREFERRED EMBODIMENTS

The described apparatus is operated as follows:

First the body belt is fastened around the lower waist.

Second, while holding the vehicle upright, the chord is attached to the belt and trestle rings.

Third, holding both handle bars, the distant foot is placed onto the near foot plate, making sure that the foot slips into the straps provided.

Fourth, the vehicle is pushed forward with the other foot and mounted by transferring body weight onto the foot engaging a runner.

Fifth the second foot is slid into the far runner foot straps.

Finally, the vehicle is propelled by simulating natural walking or running action with runners upon the rails.

Convenient and safe operation of the vehicle at varying speeds requires that the ability to brake and change gears be incorporated into the vehicle. For this purpose prior arts are adequate and it is sufficient to assert their necessity for incorporation into the preferred embodiment.

ADVANTAGES OF THE PREFERRED EMBODIMENT

The preferred embodiment provides the following advantages over other methods of enhancing human-powered locomotion.

1) It permits the rider to assume a natural posture for walking or running, providing as a result the most comfortable and effective way of propelling the rider.

2) It elevates the rider onto runners which roll on straight, level and smooth rails for minimal frictional resistance.

3) It connects the foot plates with doubly-journalled brackets so that the feet may follow a natural swing when simulating walking or running action along or above the guide rails.

4) It guides the bracket between the rails to ensure that all exertions by the foot shall be aligned to the direction of travel and power transmission.

5) It provides sturdy support for the heel by the use of dual roller wheels that straddle the guide and are wide enough not to derail under normal operation so that the rider may conveniently transfer full body weight upon the heel without fear of spraining as a result of rolling to the left or right.

6) It transmits body forces to the frame through the cord, freeing the hands and arms for the minimal effort of steering and maintaining balance against the handlebars.

Numerous modifications and variations of the present invention are possible in light of the proposed method, choice of preferred embodiment and operation thereof. It is therefore to be understood that within the scope of the claims set forth, the invention may be practiced in ways other than specifically described herein.

I claim:

1. An apparatus for enhancing human powered locomotion over a travel surface comprising:

a frame constructed to support the weight of a rider and sized to define an elongate direction that is greater in length than a person's stride length;

two spaced apart runners slidably engaging the frame to reciprocate generally parallel to each other in the elongate direction of the frame a distance approximating a person's stride, the runners each having a foot attachment constructed to engage the rider's foot;

a trestle fastened to the frame at a location separated from the runners in the elongate direction and extending away from the frame and foot attachments in the upward direction a distance approximating the distance from a person's feet to waist;

a pelvic body harness secured to the trestle and constructed to transmit forces in the elongate direction from a rider's pelvis to the trestle;

a drive wheel rotatably connected to the frame, the drive wheel extending away from the frame in a downward direction opposite the upward direction to support the frame above the travel surface;

a transmission operatively engaging the runners and the drive wheel and constructed to transmit reciprocation of the runners into rotation of the wheel, the transmission comprising:

a first sprocket and a second sprocket, each sprocket secured to the drive wheel, two endless chains extending along the elongate direction of the frame, one chain engaging the first sprocket and one chain engaging the second sprocket;

each runner having a rachet mechanism that engages one endless chain and secures the runner to the chain when the runner moves toward the drive wheel and allows the runner to slide along the chain when the runner moves away from the rear wheel; and a steering assembly having a rotatably supported steering wheel and a steering column supported by the frame to position the steering wheel extending downward from the frame, the steering column being supported to be rotatable with respect to the frame to steer the steering wheel about an axis lying generally along the downward direction from the frame;

whereby each runner engages one endless chain when moving toward the drive wheel displacing the chain and thereby causing the sprocket engaged by the chain and the drive wheel to rotate thereby causing the apparatus to move responsive to movement of the runners caused by a rider, secured to the pelvic body harness having a foot engaging each of the foot attachments, urging the runners to slide along the frame.

2. The apparatus of claim 1 wherein the pelvic body harness comprises a pliable belt adapted to engage a rider generally about the waist, and a flexible cord secured to the trestle at a first end and to the belt at a second end.

* * * * *